United States Patent

[11] 3,585,568

| [72] | Inventors | Harold C. Hervig<br>Maplewood;<br>Roy D. Erickson, St. Paul, both of, Minn. |
|---|---|---|
| [21] | Appl. No. | 860,898 |
| [22] | Filed | Sept. 25, 1969 |
| [45] | Patented | June 15, 1971 |
| [73] | Assignee | Minnesota Mining and Manufacturing Company<br>St. Paul, Minn. |

[54] SPLICE COVER AND SPLICE ASSEMBLY
4 Claims, 4 Drawing Figs.

[52] U.S. Cl. ............................................. 339/60,
339/143
[51] Int. Cl. ............................................. H01r 13/52
[50] Field of Search ............................................. 339/36,
59—61, 153, 154, 143, 198

[56] References Cited
UNITED STATES PATENTS

| 2,407,894 | 9/1946 | Miller | 339/60 |
| 3,243,756 | 3/1966 | Ruete et al. | 339/60 |
| 3,514,741 | 5/1970 | Noren | 339/60 |

*Primary Examiner*—Marvin A. Champion
*Assistant Examiner*—Joseph H. McGlynn
*Attorney*—Kinney, Alexander, Sell, Steldt and Delahunt ABSTRACT: Modular high voltage junction or splice assembly useful in underground electrical distribution system employs an elastomeric modular cover having close fitting conical plug-and-socket connections between modules, the plugs having a greater angle with the axis than do the sockets.

PATENTED JUN 15 1971

3,585,568

INVENTORS
HAROLD C. HERVIG
ROY D. ERICKSON
Kinney, Alexander,
Sell, Steldt & DeLaHunt
ATTORNEYS

SPLICE COVER AND SPLICE ASSEMBLY

This invention relates to high voltage cable splicing systems and is particularly applicable to underground electrical distribution systems involving modular splicing.

With underground distribution systems it is frequently found necessary to make additional connections to existing installations. Such junctions must be exceedingly well protected and insulated, and at the same time should be easily opened for inspection or for addition of still further taps or lines. The present invention provides for excellent insulation of a modular system to which additional leads may easily be attached. The system is readily accessible for test, yet is rugged and highly resistant to failure under the moderate mechanical stressing or flexing frequently encountered in underground systems. The modules are easily assembled, and the assembly is surprisingly compact.

Figure 1:
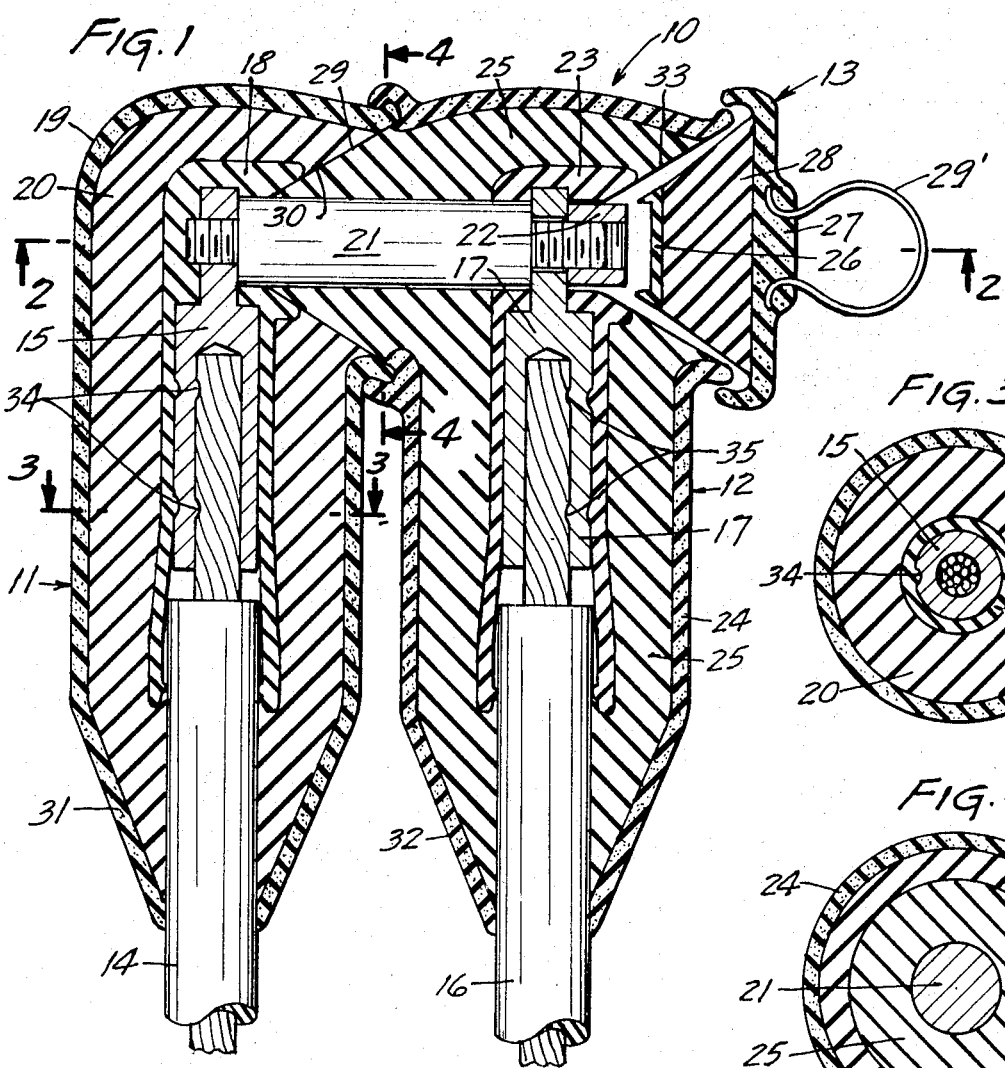
Figure 3:
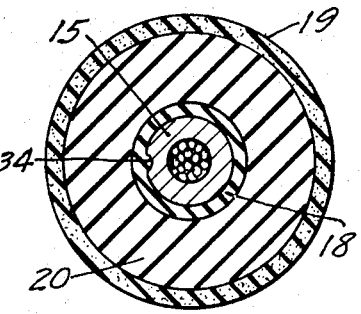
Figure 4:
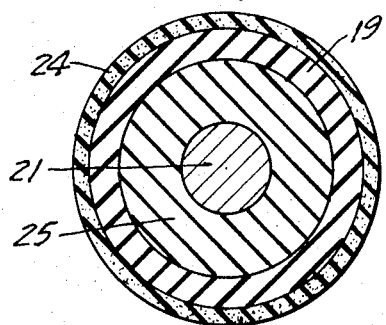
Figure 2:
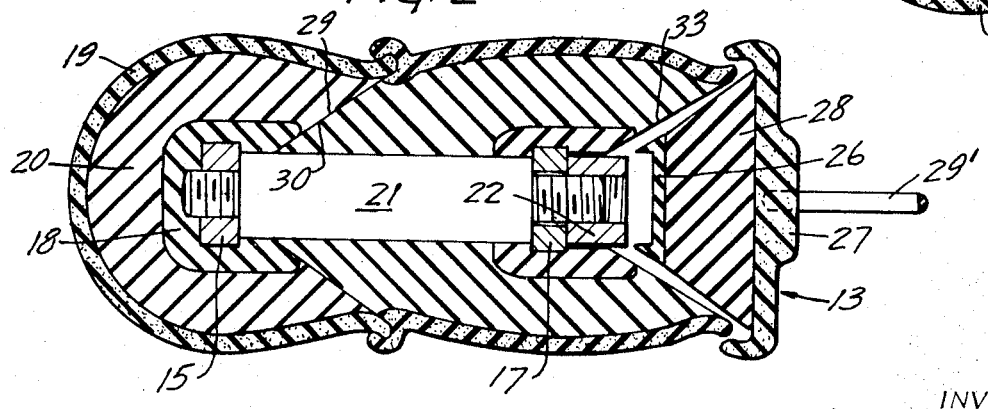

In the drawing, in which is illustrated a presently preferred embodiment of the invention, FIG. 1 is a sectional elevational illustration of an assembly containing a single supply line and single distribution line, with an access plug partially removed as for inspection, FIG. 2 is a sectional view taken approximately at line 2–2 of FIG. 1, FIG. 3 is a partial sectional view of one leg of the system, taken approximately at line 3–3 of FIG. 1, and FIG. 4 is a sectional view taken approximately at line 4–4 of FIG. 1.

The assembly 10 of FIG. 1 will be seen to include a first insulating member 11 containing a supply cable end 14 and attached terminal 15, a single second insulating member 12 containing a distribution cable end 16 and terminal 17 and a connecting bar 21 and nut 22, and a third insulating member 13 serving as a closure plug or cap for the open side of member 12 and here shown in detached position.

Member 11 consists of a generally cylindrical rubbery insulating body 20 terminating at one end in a conical extension 31 open along the axis. The opening extends toward and near to the closed end of the body, the latter being integrally lined with a semiconductive rubbery liner 18 shaped to fit closely about the terminal 15 and cable end 14. The member 11 is open at one side near the closed end in an outwardly expanding conical opening 29. In the illustration the cone is shown to have an angle of approximately 30° with its axis. The semiconductive liner 18 extends part way along the inner portion of the conical surface, as shown. An outer semiconductive and protective rubbery shield or covering 19 completes the structure.

Member 12 is identical with member 11 as to the conical open end 32, semiconductive liner 23, and conical opening 33, but in addition is provided at a position opposite the opening 33 and along the same axis with a hollow cone-shaped outwardly diminishing plug extension 30.

The cap or plug 13 is also conical in shape. It consists essentially of a rubbery insulating body 28 fitting closely around the end of the nut 22, and an outer semiconductive layer 27. A handle, such as the ring 29', is provided for ease in removing the plug. It is desirable, although not essential, to incorporate in the plug structure an inner semiconductive rubbery layer 26.

In assembling a connection, the terminals 15 and 17 are attached to the exposed tips of the cables 14 and 16, for example by crimping as indicated by depressions 34, 35. These subassemblies are forced into the members 11 and 12. A connecting bar 21 is screwed into the threaded perforate terminal 15. The member 12 is fitted over the bar, the exposed threaded tip of which passes through the perforate terminal 17, and the whole is drawn tightly together with nut 22. The plug 13 is then forced into the opening 33, the layer 26, when present, fitting over and around the nut 22 and making contact with the extended liner 23. The external semiconductive coverings 19, 24, 27 are provided with mating edges, e.g. of the interlocking lip type illustrated, to assure continuity of the shield. If necessary, the plug 13 may be held in place by an external clamp, not shown.

It will be apparent from the foregoing that additional distribution cables may be easily affixed prior to application, or upon subsequent removal, of the plug 13. In each such instance the next connecting bar 21 is first threaded tightly into the open end of the last nut 22 and the next distribution member 12 with enclosed cable end 16 and terminal 17 is fitted and forced onto the assembly, the plug then being replaced.

An alternative structure wherein the relationship of plugs and sockets is reversed provides certain advantages and is contemplated. More specifically, the initial module 11 will be provided with a conical plug extension in place of the conical socket 29, and will contain both the terminal 15 and connector 21. The position of the succeeding modules 12 will then be reversed from that shown in FIG. 1, the conical sockets 33 fitting against the preceding plugs 29. The cap 13 will be replaced by a cap member formed with a conical socket. With such an assembly, removal of the end cap exposes the end of the connector bar extending well beyond the exposed edges of the conductive shield, thereby minimizing any danger of shorting between connector and shield when contacting the former with a test instrument.

Other forms of cable terminals and conductive connecting means may be substituted for the perforate terminal lugs, threaded connector bars and elongate nuts here illustrated, the semiconductive liners being suitably formed to accept such members. One such alternate form is disclosed in Erickson application Ser. No. (file 26655) filed of even date herewith.

Particularly in assemblies containing several distribution members, and which may extend in several directions, the assembly may at times undergo considerable stress, e.g. from soil movement occasioned by temperature changes or other phenomena. Under such conditions, the previously known plug-and-socket type joints are frequently found to open to an extent sufficient to impair or destroy the insulating efficiency of the covering.

It has now been found possible to eliminate this difficulty, in the device herein described, by forming the conical socket with its sides at an angle of between about 15° and about 45° with its axis, and by forming the corresponding conical plug with its sides at an angle greater than that of the socket by at least about 3° but not more than about one-third the socket angle.

By way of illustration, a plug angle of between about 33° and about 40° is highly effective when used with the preferred socket angle of 30°. At a socket angle of 15°, plugs formed at angles between about 18° and about 20° provide fully effective closure. Socket angles of 45° may be used effectively with plug angles of between 48° and 60°.

Both insulating and semiconductive rubbery compositions are known. "Nordel" elastomeric ethylene-propylene terpolymer is a preferred material which is available in both forms and is suitable in the devices of the present invention. A Shore A durometer of about 50 is preferred, with somewhat softer stock showing some advantages at the higher cone angles and harder elastomeric materials being useful only at the lower angles.

Within the approximate limits thus defined, the insulating members are found to form junctures having substantially the full insulative qualities of the polymer even under conditions of high mechanical stress. Contact between socket and plug is initiated at the outer rim and progresses along the line of decreasing diameter as the assembly is completed. The socket is elastically stretched, and thereafter maintains full contact with the plug even though the assembly may undergo severe bending, twisting or other stresses. Extension of the conductive liner part way along the inner portion of the conical socket assists further in reducing electrical stresses at such area, and full electrical protection is maintained.

A further and highly significant advantage of the structure described is the substantially complete elimination of air pockets. The air initially contained within the cone area is progressively forced into the interior as the socket and plug come together, and escapes by way of the several interfaces into or along the cable sheath. No voids remain at the junction area, and a fully effective seal is established. By first placing a thin wire along the junction, air may instead be forced outwardly, the wire subsequently being withdrawn.

As a further precaution it is sometimes found desirable to include small quantities of insulating grease within the insulating members. Ease of insertion of the metallic components is increased, occasional voids are filled, moisture is excluded, and insulating qualities are improved. A dielectric grease applied over one or both of the conical plug and socket surfaces is particularly desirable in providing a well-fitting and waterproof juncture with minimum application force requirements.

What We claim is as follows:

1. A flex-resistant protective insulating covering for a modular high voltage electrical distribution junction assembly, comprising a plurality of generally cylindrical elastomeric hollow insulating body members closed at one end and open at the other edn for insertion of a perforate cable terminal lug, each but one of said body members being formed with a conical socket at one side and a conical plug at the opposite side and along a common axis perpendicular to the axis of the hollow interior of said plug and adjacent the closed end, said one body member being a terminal body member formed with but one of said socket and plug, and a terminal cap member complementing said one body member and being formed with the other of said socket and plug, thereby permitting assembly of said members in closed linear relationship along the line of said common axis; each said member having an outer conductive layer mating at the edges with the conductive layer of any adjacent member to form a continuous conductive shield about said assembly; each of said body members being provided with a semiconductive liner integral therewith and shaped to fit snugly about a cable terminal lug inserted in the body member and to extend part way along any inner conical socket surface of said body member; and said members being further characterized in that the conical socket surfaces are formed at an angle with the axis of between 15° and 45° and the conical plug surfaces are formed at an angle with the axis which angle is greater than the socket surface angle by an amount of between about 3° and about one-third of said socket surface angle.

2. The insulating covering of claim 1 wherein the socket angle is about 30°.

3. The insulating covering of claim 1 wherein said terminal body member is formed with a conical socket and said terminal cap member has the conical plug configuration.

4. A modular high voltage electrical distribution junction assembly including a plurality of interconnected cable terminal lugs within a protective insulating covering as defined in claim 1.